United States Patent Office 3,408,207
Patented Oct. 29, 1968

3,408,207
PROCESS FOR MAKING A FREEZABLE
EGG FOOD PRODUCT
Max Katz, Lakewood, N.J., assignor to Howell Foods
Corp., Lakewood, N.J., a corporation of New Jersey
No Drawing. Continuation-in-part of application Ser. No.
433,451, Feb. 17, 1965. This application Feb. 2, 1967,
Ser. No. 613,421
2 Claims. (Cl. 99—196)

ABSTRACT OF THE DISCLOSURE

A freezable egg food product comprising raw eggs, water, low methoxyl pectin, and salt proteinates, capable of retaining its flavor despite prolonged freezing prior to cooking, and maintaining its flavor, shape, color and texture during and after cooking; and a process for making such food product.

---

This is a continuation-in-part of application Ser. No. 433,451 of the same title filed Feb. 17, 1965, now abandoned.

This invention relates to frozen food products, and in particular, to an egg food product suitable for freezing and for cooking in the form of an omelet.

Numerous attempts have been made for the commercial production of frozen egg products. Such products, particularly those suitable for mixing with ingredients other than eggs for preparation in the form of an omelet, have not achieved wide acceptance. Thus, the need for an acceptable frozen egg product, capable of long frozen storage and rapid preparation, and appetizing in taste, color and texture, has heretofore remained unsatisfied. Such need has been felt by housewives; institutions such as schools, hospitals, and the like; the military; and commercial establishments, such as restaurants, cafeterias, etc.

Major problems affecting the potential use of frozen egg products, particularly those having nonegg components, are separation or settling of the components during storage or preparation, resulting in a characteristic rubbery taste and texture; off-flavor or odor during and after cooking; and the tendency of known frozen egg products to spread, melt and run during cooking.

Moreover, in addition to the above-mentioned problems common to frozen egg products, any egg, even one fresh from the shell, will become stringy, rubbery, and tasteless if held at above freezing temperatures for any appreciable length of time after being cooked. The taste and texture of a scrambled egg kept for more than a few minutes after cooking, is commonly known, and generally regarded as unpleasant. Moreover, it is well known that eggs held in a warmer exhibit a tendency to take on a greenish off-color.

The present invention has as its principal object the provision of a frozen egg product which when cooked will possess the flavor, color and texture of fresh eggs.

The invention has an another of its objects the provision of an egg product capable of being stored and served in the form of an omelet.

Still another object of the invention is to provide a frozen egg product capable of maintaining its color, taste, and texture for a considerable time after cooking.

Yet another object of the invention is to provide a frozen food product which may be easily shaped for portion control.

Still another object of the invention is to provide a frozen egg product capable of maintaining its shape while being cooked, and without a tendency to run and spread on the grill.

Another object of the present invention is to provide a method of manufacturing an egg product wherein the ingredients may be mixed without precooking.

Other objects will appear hereinafter.

The freezable egg food product of the present invention comprises about 40 parts by weight of raw eggs, about 5 to 40 parts by weight of water, about 1/16 to 1/2 part by weight of low methoxyl pectin, and from about 1/16 to about 2½ parts by weight of salt proteinate.

In the process of the present invention, the above-stated quantities of components are mixed by forming an aqueous solution of the low methoxyl pectin, mixing the salt proteinate with such aqueous solution to form a mixture of smooth consistency, blending the mixture with the raw eggs to form a liquid egg product, and freezing said product to form the freezable egg product.

It has been found that the addition of an aqueous solution of low methoxyl pectin to raw egg results in gelling due to union of the calcium ions of the egg with the carboxyl groups of the low methoxyl pectin. Also, the low methoxyl pectin acts as a humectant and emulsifier, breaking up globules of fat in the yolk, and avoiding their coalescence when the frozen product is reconstituted. The viscous and gelatinous mass thus formed exhibits none of the tendency of eggs in their natural state and of frozen egg products previously known to take on a rubbery texture. Moreover, the resultant gel holds in suspension any solid ingredients added to the product as set forth hereinafter. Low methoxyl pectins, unlike high methoxyl pectins, are effective gel-formers, even in the absence of sugar, and are therefore well suited for use with eggs. A low methoxyl pectin suitable for the purposes of the present invention is the low methoxyl pectin sold under the trademark "Exchange" by Sunkist Growers, Inc., described in the publication "Pectin L.M." by Sunkist Growers, Inc. (1953).[1]

It is known that low methoxyl pectins form gels at temperatures higher than many other gel-forming agents used in foods, such as for example, gelatine. Nevertheless, low methoxyl pectin gels do tend to lose their firmness at temperatures well below the usual cooking range. Indeed, it has been found that a mixture of raw egg, water and low methoxyl pectin exhibits the shortcoming of tending to spread and run on the grill during cooking, in much the same way as previously known frozen egg products.

In accordance with the present invention, the aforementioned problem is overcome by the inclusion in the product of certain salt proteinates. The salt proteinates serve as fillers or bodying agents, holding the water released by the gel upon heating, and are effective at the elevated temperatures at which the gelling action of the low methoxyl pectin is nullified. Thus, the shape and consistency of the product is maintained throughout the range of temperatures to which it is subjected during cooking and thereafter by the action of the salt proteinates. Moreover, the salt proteinates inhibit the characteristic runoff of liquid from cooked egg products, commonly referred to as "weeping." An additional advantage derived from the salt proteinate is an increase in the nutritional value of the product. Thus, the end product in accordance with the present invention has virtually the same protein content as in a like quantity of pure egg.

It has been found advantageous to employ a blend of salt proteinates in connection with the herein disclosed product, namely a mixture of sodium soy proteinate and sodium caseinate. Both of these salt proteinates should be present in the compositions of the present invention.

---

[1] A pectin having 3.5–5% methoxyl on moisture ash-free basis.

The sodium soy proteinate is a strong bodying agent, and its use results in a firm product. The sodium caseinate has different binding properties and yields a softer and less cohesive product. The presence of both sodium proteinates within the freezable egg food products of the present invention enable such egg food products to be tailormade to fit particular requirements, and to accommodate different types of eggs.

A wide variety of sodium soy proteinates which may be used in the present invention are commercially available. By way of example, a suitable sodium soy proteinate is "Promine D" whose analysis and properties are given in Technical Report No. 200, published by Central Soya, Chemurgy Division, Chicago, Ill.

A wide variety of sodium caseinates are commercially available which can be used in the freezable egg food products of the present invention. A suitable sodium caseinate is described in Technical Bulletin 201 released by Land O'Lakes Creameries Incorporated, Minneapolis, Minn., directed to "Land O'Lakes Sodium Caseinate."

The relative proportions of the various components of the food product of the present invention are determined by the following criteria. Concerning the low methoxyl pectin, it is essential that enough be provided to bring about the desired viscous and gelatinous consistency, but, if the ratio of low methoxyl pectin to water and egg is too high, the resultant product is unpalatable, and too stiff to pump or handle conveniently. On the other hand, if the low methoxyl pectin content is too low, the product, while palatable, tends to be too watery, and to break up upon cooking. The ratio of low methoxyl pectin to egg will also vary with the quality of the egg used. Specifically, the ratio will vary with the calcium content of the egg. Such calcium content will vary with geographical area, the season, and the type of chicken. Egg of higher calcium content requires less low methoxyl pectin. It is also feasible to add other sources of calcium, for example, milk, to the mix, thereby enhancing its gelling action.

Concerning the water, the amount need only be sufficient to dissolve the low methoxyl pectin, but if desired, the water may be increased considerably above this amount. Too much water results in a product no longer recognizable as egg.

Concerning the salt proteinate, there are two factors determining the upper limit. First, if the ratio of salt proteinate to water and egg is too high, the product takes on a mealy texture, unlike that of pure egg. Second, salt proteinates give off an unpleasant odor, and take on an off-color at elevated temperatures, approximately 160° to 170° F. Accordingly, it is necessary to keep these ingredients at a minimum to minimize the effect of any off-color or odor during cooking.

It has been found that the amount of salt proteinate to be used depends in part on the nature of the ultimate product to be produced. Thus, it should be apparent to those skilled in the art that the present invention may be applied to any number of egg-containing dishes, for example, western, pepper or cheese omelets, or cheese souffle. It has been found that with dishes containing chunks of solid matter, as in the case of a western omelet, bits of pepper, ham and onion, the intrinsic binding property of the egg is affected, and the product lacks the holding strength of an egg mass unbroken by foreign particles. The foreign particles impart to the product a tendency to crumble or separate on handling. Accordingly, with such a dish, it is necessary to augment the natural binding qualities of the egg and this is accomplished by means of the salt proteinate. Also, as a matter of aesthetic appeal, an omelet is generally thought to require a more solid and firm texture than a plain scrambled egg. Again, an increased amount of salt proteinate is indicated. Thus, the lower limit of salt proteinate content is determined by the mechanical properties of the product. As indicated above, the upper limit is determined by the likelihood of off-odor and color with higher concentrations of the salt proteinate.

The salt proteinate component of the product may be made up of more than a single type of salt proteinate, each type lending to the product certain desired characteristics.

In the case of a plain scrambled product, the sodium soy proteinate, which alone would be unsuitable, serves to impart a desired cohesiveness. The sodium caseinate imparts a soft, creamy texture. In the case of a western omelet, where a firmer product is desired, and the intrinsic binding properties of the egg are less noticeable, it is feasible to use a salt proteinate component consisting of sodium soy proteinate.

The following examples illustrate in greater detail the relative amounts in parts by weight of components of compositions in accordance with the present invention:

EXAMPLE 1

Plain (scrambled) egg product:

|  | Low $H_2O$ | Preferred | High $H_2O$ |
|---|---|---|---|
| Eggs (raw) | 40 | 40 | 40 |
| Water | 5 | 10-40 | 40 |
| Salt proteinate [1] | Trace-1 | $\frac{3}{4}$-$1\frac{1}{2}$ | $\frac{1}{4}$-$2\frac{1}{2}$ |
| Low methoxyl pectin | $\frac{1}{16}$-$\frac{23}{32}$ | $\frac{1}{8}$-$1\frac{1}{4}$ | $\frac{1}{16}$-$1\frac{1}{2}$ |

[1] Salt proteinate is equal parts by weight sodium caseinate and sodium soy proteinate.

EXAMPLE 2

Composition of omelet or other product containing discrete foreign particles in suspension (e.g. western or pepper omelet):

|  | Low $H_2O$ | Preferred | High $H_2O$ |
|---|---|---|---|
| Egg (raw) | 40 | 40 | 40 |
| Water | 5 | 20-40 | 40 |
| Salt proteinate [1] | Trace-1 | $1\frac{1}{2}$ | $\frac{1}{8}$-$2\frac{1}{2}$ |
| Low methoxyl pectin | $\frac{1}{8}$-$\frac{23}{42}$ | $\frac{1}{4}$-$1\frac{1}{4}$ | $\frac{1}{8}$-$2\frac{1}{2}$ |
| Chopped or ground ham | $10\frac{2}{3}$ | $10\frac{2}{3}$ | $10\frac{2}{3}$ |
| Reconstituted pepper and onions | $21\frac{2}{3}$ | $21\frac{2}{3}$ | $21\frac{2}{3}$ |

[1] Salt proteinate is sodium soy proteinate.

EXAMPLE 3

Composition for cheese omelet or cheese souffle:

|  | Low $H_2O$ | Preferred | High $H_2O$ |
|---|---|---|---|
| Egg (raw) | 40 | 40 | 40 |
| Water | 5 | 20-40 | 40 |
| Salt proteinate [1] | Trace-1 | $1\frac{1}{2}$ | $\frac{1}{8}$-$2\frac{1}{2}$ |
| Low methoxyl pectin | $\frac{1}{8}$-$\frac{23}{42}$ | $\frac{1}{4}$-$1\frac{1}{4}$ | $\frac{1}{8}$-$1\frac{1}{2}$ |
| Blended cheeses | 16 | 16 | 16 |

[1] Salt proteinate component is 5 parts by weight sodium soy proteinate to 1 part by weight sodium caseinate.

It is seen from the foregoing that the salt proteinate component of the present invention may be either sodium caseinate or sodium soy proteinate, or both, depending upon the type of freezable egg food product, and the desired properties thereof, which is being prepared. One having normal skill in the art with the teachings of the present invention can evolve the best concentration of components after routine testing of a noninventive nature.

In one of its aspects, the present invention involves the process whereby the above-disclosed egg product is made. In this regard, a measured quantity of water is first heated to approximately 120° F. to 160° F., preferably about 150° F. Such heating is to effect partial sterilization of the water. The temperature, however, is well below the temperature at which the salt proteinates take on undesirable off-odor or color as set forth above. The low methoxyl pectin is then dissolved in the water under agitation. The time needed to completely dissolve the low methoxyl pectin is generally about 10 to 15 minutes. After the low methoxyl pectin is dissolved, the salt proteinate or proteinates, together with any seasonings to be used may be added and dissolved. Agitation of the resulting mix is continued until the entire mass attains a smooth, creamy consistency.

The warm mix is combined with chilled eggs under vigorous agitation. It has been found desirable to add the mix to the eggs, rather than vice versa. Thus, if the eggs are added to the mix, there is a tendency to form a lumpy, nonuniform product. At the same time, the mix is combined with the chilled eggs, additional ingredients, such as meats, pepper, onions and cheese are added. When the mix, egg, and additional ingredients are thoroughly combined, the liquid product may be cooled and then shaped. The shaping process may be accomplished by mold, slab or the like. I have found a mold having circular depressions ¾" in diameter and ½" in depth suitable. Alternatively, the liquid product may be poured into containers and frozen.

The following detailed examples are illustrative of the manner in which the present process is accomplished:

EXAMPLE 4

Forty-eight (48) pounds of hot water at approximately 150° F. are poured into a heated vat containing a propeller type agitator, and allowed to cool to approximately 143° F. Under agitation, 12 ounces of low methoxyl pectin are slowly added to the water. When the low methoxyl pectin is thoroughly dissolved, usually after about 10 minutes, 28 ounces of sodium soy proteinate, 6 ounces of sodium caseinate, and salt, pepper and spices to taste are added to the resultant solution. Agitation is continued for approximately 15 to 30 minutes, or until the mixture thickens to a light cream consistency.

120 pounds of raw liquid egg, either fresh or frozen and defrosted, at a temperature of from 33° to 38° F. are poured into refrigerated stainless steel vat containing a propeller type agitator. Vigorous agitation is maintained, while the contents of the first-mentioned vat are added to the egg, and continued for 5 to 15 minutes thereafter until complete blending is established, or until such time as the mix attains a temperature of about 65° F. to 80° F.

When mixing is complete, the product may be poured into portion molds, for example, by means of a hopper filler, and frozen by heat exchange to 28° F. to 29° F. As an alternative, the product can be poured into bulk containers and frozen in a similar manner. The resultant product is of optimum composition for a plain scrambled product or souffle, and may be readily prepared by baking or frying on a griddle.

EXAMPLE 5

60 pounds of hot water at approximately 150° F. are poured into a heated vat containing a propeller type agitator, and allowed to cool to approximately 143° F. Agitation is begun, and 12 ounces of low methoxyl pectin are slowly added to the water. When the low methoxyl pectin is thoroughly dissolved, usually after about 10 minutes, 3 pounds of sodium soy proteinate, and salt, pepper, and spices to taste are added to the resultant solution. Agitation is continued for approximately 15 to 30 minutes, or until the mixture thickens to a light creamy consistency.

120 pounds of raw liquid egg, either fresh or frozen and defrosted, at a temperature of from 33° to 38° F. are poured into refrigerated stainless steel vat containing a propeller type agitator. Vigorous agitation is maintained while the contents of the first-mentioned vat are added to the egg, and continued for 5 to 15 minutes thereafter until complete blending is established, or until such time as the mix attains a temperature of 65° F. to 80° F. 16 pounds of chopped or ground ham and 32 pounds reconstituted pepper and onions are added to the eggs with the contents of the first-mentioned vat.

When mixing is complete, the product may be poured into portion molds, containers, or slabs, and frozen by heat exchange to 28° F. to 29° F. As an alternative, the product can be poured into bulk containers and frozen in a similar manner. The resultant product is of optimum composition for a western omelet, and may be prepared by baking or frying.

EXAMPLE 6

60 pounds of hot water at approximately 150° F. are poured into a heated vat containing a propeller type agitator, and allowed to cool to approximately 143° F. Under agitation, 12 ounces of low methoxyl pectin are slowly added to the water. When the pectin is thoroughly dissolved, usually after about 10 minutes, 40 ounces of sodium soy proteinate, and 8 ounces of sodium caseinate are added to the resultant solution. Agitation is continued for approximately 15 to 30 minutes, or until the mixture thickens to a light creamy consistency.

120 pounds of raw liquid egg at a temperature of from 33° F. to 38° F. are poured into a refrigerated stainless steel vat containing a propeller type agitator. Vigorous agitation is maintained while the contents of the first-mentioned vat are added to the egg, and continued for 5 to 15 minutes thereafter until complete blending is established, or until such time as the mix attains a temperature of 65° F. to 80° F. 16 pounds of blended cheeses are added to the eggs with the contents of the first-mentioned vat.

When mixing is complete, the product may be poured into portion molds, and frozen by heat exchange to 28° F. to 29° F. As an alternative, the product can be poured into bulk containers and frozen in a similar manner. The resultant product is of optimum composition for a cheese omelet or souffle, and may be prepared by baking or frying.

The egg food product of the present invention is preferably cooked by dry heat such as baking or frying, and can be cooked by steaming. The latter method of cooking is less desirable than the others, however, since prolonged steaming causes the off-odor and off-color of the salt proteinate to become noticeable.

It is necessary to practice the above-disclosed process with stainless steel apparatus, since the egg has the tendency to blacken other commonly used metals.

The herein disclosed product will exhibit a very slight spread when heated on a flat plate. Thus, the spread of a 2½ ounce portion of the product will be under ½". Moreover, the cooperative relationship between the low methoxyl pectin gel and the salt proteinates results in the product retaining its moisture during cooking. Such moisture retention avoids the tendency of natural egg to take on a rubbery consistency during cooking. The novel interaction of the gel and the salt proteinate also accounts for the discrete food ingredients remaining in suspension and more or less evenly dispersed throughout the product, before, during and after cooking.

The present invention yields an egg food product having taste, texture and consistency strikingly similar to that of whole fresh eggs. Moreover, when it takes the form of an omelet, the resultant product is again virtually identical to a like product made with fresh eggs. Furthermore, as is set forth hereinabove, the product in accordance with the present invention is capable of retaining its taste, texture and color, even if kept at above-freezing temperatures, after cooking, and in this regard, the product is a considerable advance over known frozen or fresh egg food products.

The present invention may be embodied in other specific forms without departing from the spirit or essential attributes thereof and, accordingly, reference should be made to the appended claims, rather than to the foregoing specification as indicating the scope of the invention.

I claim:
1. A process for making a freezable egg food product comprising forming an aqueous solution of about 1/16 to 1½ parts of low methoxyl pectin in about 5 to 40 parts by weight of water at a temperature of between about 120° F. to 160° F., adding to said solution a mixture of about 1/16 to about 2½ parts by weight of sodium caseinate and sodium soy proteinate, vigorously agitating the mixture to form a creamy homogeneous mixture, and combining about 40 parts by weight of chilled raw eggs with said creamy mixture, agitating the resultant mixture, and then freezing it.

2. A process in accordance with claim 1 in which the creamy mixture is added to the chilled raw eggs.

References Cited

UNITED STATES PATENTS

| | | | |
|---|---|---|---|
| 1,737,365 | 11/1929 | Epstein | 99—196 |
| 2,381,407 | 8/1945 | Levinson et al. | 99—64 |
| 2,673,157 | 3/1954 | Shepherd et al. | 99—132 |
| 3,073,704 | 1/1963 | Rivoche | 99—196 |

LIONEL M. SHAPIRO, *Primary Examiner.*